United States Patent [19]

Sederquist et al.

[11] Patent Number: 5,931,658
[45] Date of Patent: Aug. 3, 1999

[54] FUEL CELL POWER PLANT FURNACE

[75] Inventors: Richard A. Sederquist, Newington; Donald F. Szydlowski, Ellington; Thomas J. Corrigan, Vernon; Stanley P. Bonk, Tolland, all of Conn.

[73] Assignee: International Fuel Cells, South Windsor, Conn.

[21] Appl. No.: 08/863,643

[22] Filed: May 28, 1997

Related U.S. Application Data

[63] Continuation of application No. 08/420,960, Apr. 12, 1995, abandoned.

[51] Int. Cl.⁶ ........................................................... F23D 11/44
[52] U.S. Cl. .......................................... 431/207; 429/19
[58] Field of Search ................................. 48/94, 214 A; 110/229, 254; 429/19; 431/11, 207, 243; 432/178, 179

[56] References Cited

U.S. PATENT DOCUMENTS

| | | | |
|---|---|---|---|
| 1,460,631 | 7/1923 | Wiederwax | 431/243 |
| 3,522,019 | 7/1970 | Buswell et al. | 23/288 |
| 4,847,051 | 7/1989 | Parenti, Jr. | 422/202 |
| 4,861,348 | 8/1989 | Koyama et al. | 48/94 |
| 4,976,463 | 12/1990 | Soo | 431/11 |
| 5,308,456 | 5/1994 | Kunz et al. | 429/19 |

FOREIGN PATENT DOCUMENTS

| | | |
|---|---|---|
| 1043291 | 11/1958 | Denmark . |
| 0654838 | 11/1993 | European Pat. Off. . |
| 2-119061 | 5/1990 | Japan . |
| 2-129001 | 5/1990 | Japan . |
| 3232702 | 1/1992 | Japan . |
| 4098011 | 3/1992 | Japan . |
| 6040704 | 2/1994 | Japan . |
| 1092380 | 11/1967 | United Kingdom . |

OTHER PUBLICATIONS

Reformer for PAFC and Ultra Desulfurization Catalyst Dated Dec. 12, 1991 By Osamu Okada, Osaka Gas Co., LTD., Research & Development Center.

*Primary Examiner*—Noah P. Kamen

[57] ABSTRACT

A fuel cell system, generally, has a fuel processing apparatus for steam reforming a hydrocarbon fuel and steam into a product gas, and a fuel cell stack for converting the product gas into electricity. The fuel processing apparatus is a catalytic reaction apparatus having a furnace and a catalytic reactor. In an effort to increase the efficiency of the catalytic reaction apparatus and decrease the size and/or number of catalytic reactors, the present invention relates to a furnace that utilizes air and fuel pre-heat chambers to increase the flame temperature within the furnace.

18 Claims, 3 Drawing Sheets

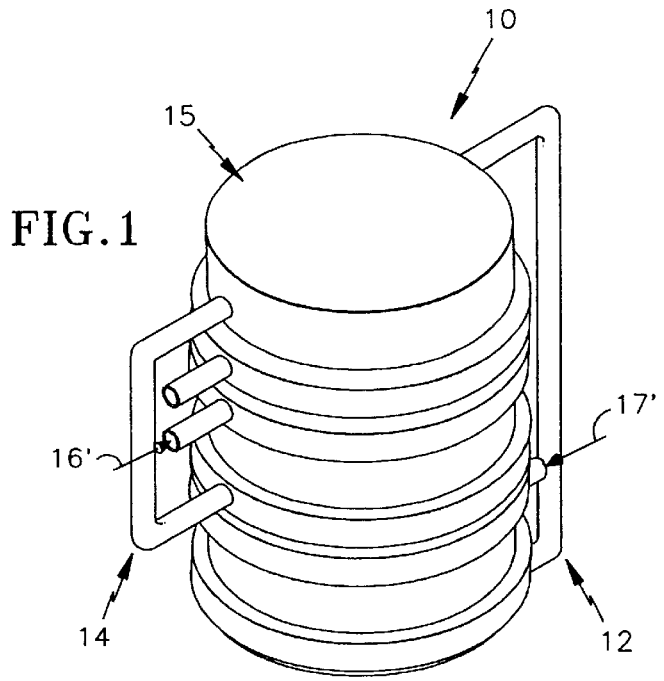
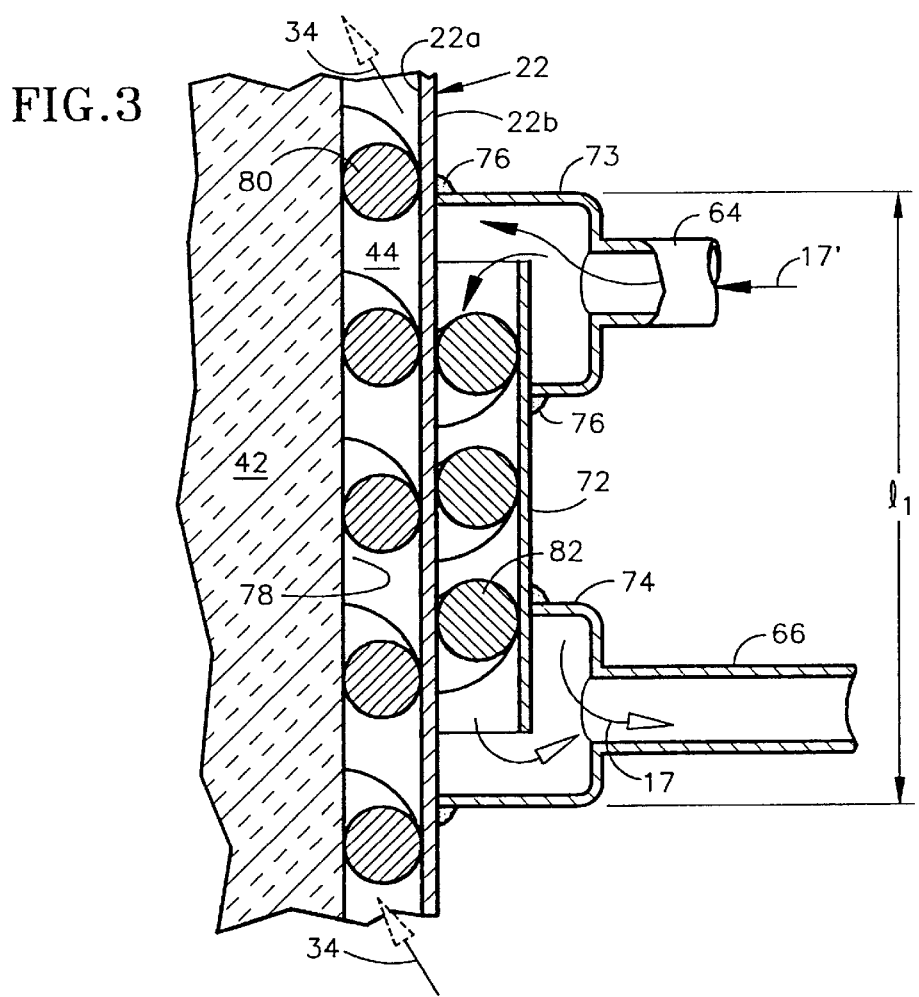

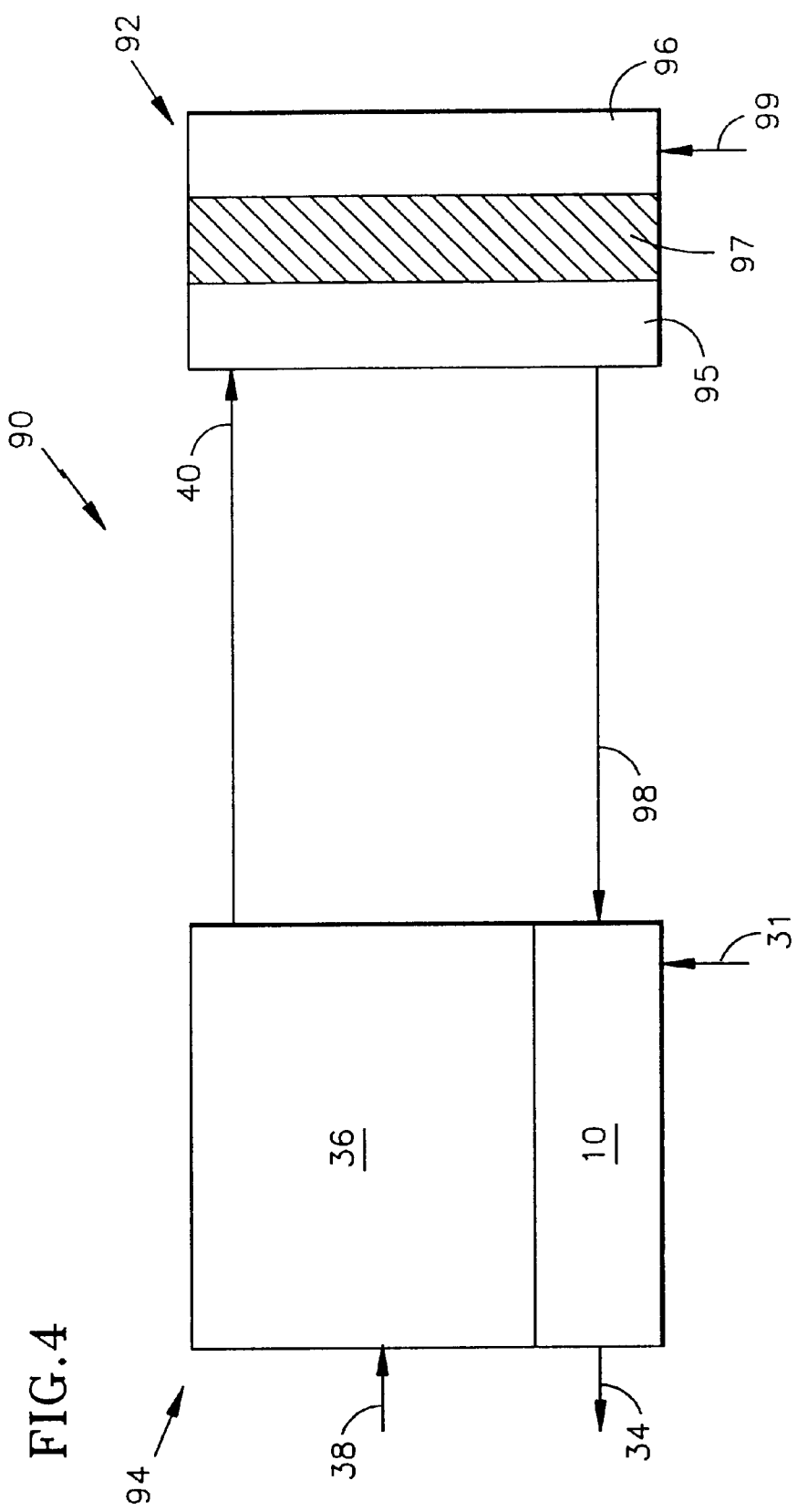

FUEL CELL POWER PLANT FURNACE

This is a request for filing a Continuation Application under 37 CFR 1.62 of prior pending application Ser. No. 08/420,960 filed on Apr. 12, 1995, abandoned.

TECHNICAL FIELD

The present invention relates to hydrocarbon fuel processing for a fuel cell power plant, and more particularly, to an improved furnace design for a fuel cell power plant.

BACKGROUND OF THE INVENTION

Fuel cell power plants for producing electricity from a hydrocarbon fuel are well known in the art and generally consist of a fuel cell stack and a fuel processing apparatus. The fuel cell stack electrochemically converts a hydrogen-rich product gas and an oxidant into electricity. The fuel cell stack has individual fuel cells aligned in series. Each fuel cell is formed by an anode, a cathode, and an electrolyte disposed therebetween. Both the anode and the cathode utilize various well known catalysts. The fuel processing apparatus and the anode are in fluid communication, such that the hydrogen containing product gas is supplied to the anode where the product gas is electrochemically reacted. The product gas containing unused hydrogen is vented from the anode as an anode exhaust. The cathode, which is in fluid communication with an oxidant source, is supplied with an oxidant, usually in the form of Oxygen. At the cathode, the oxidant is electrochemically reacted.

The fuel processing apparatus steam reforms a hydrocarbon fuel and steam into the product gas in order to increase the hydrogen content in the product gas. The product gas is then fed to the fuel cell stack. The steam reformation process is accomplished by contacting the hydrocarbon fuel and steam with a heated catalyst.

The fuel processing apparatus has a furnace which is the heat source for the reformation process and at least one catalytic reactor disposed within the furnace. The furnaces useful for practicing this fuel processing are conventional and typically comprise a shell or housing, air and fuel inlets for introducing air and fuel, respectively, into the furnace shell, as well as, an exhaust port for removing the combustion gases which results from the ignition of the two gases. The catalytic reactors used are also conventional and have an inlet for introducing the hydrocarbon fuel and steam into the catalytic bed to effect the steam reformation.

In operation, the air and the furnace fuel are introduced into the furnace using the air and fuel inlets, respectively. The air may be supplied as compressed air or oxygen, whereas, the furnace fuel may be introduced directly from a fuel source or from the anode exhaust of a fuel cell which contains excess hydrogen not reacted within the fuel cell. Within the furnace, the furnace fuel is burned by a conventional means thereby producing the combustion gases. The combustion gases then flow along the outside of the catalytic reactor to heat the catalyst bed therein. The hydrocarbon fuel and steam enter the reactor through the reactor inlet and flow through the catalyst bed in the reactor. Typically, the flow of the hydrocarbon fuel and steam through the catalyst bed is counter-current to the flow of the combustion gases. The heat from the combustion gases is transferred to the hydrocarbon fuel and steam. This heat transfer relationship drives the steam reformation process within the catalytic reactor between the hydrocarbon fuel, steam and the catalyst, thus producing the hydrogen-rich product gas. After the heat transfer relationship between the combustion gases and the catalytic reactor, the combustion gases exit the shell through the exhaust port. The product gas exits through the reactor exit.

Significant cost savings can be achieved by decreasing the number and/or size of the catalytic reactors, not only by decreasing the amount of expensive materials necessary to build the reactor, but also by decreasing the necessary amount of expensive catalyst necessary to run the reactor. It is well known in the art that the size and/or number of catalytic reactors can be reduced by increasing the flame temperature. The flame temperature is the temperature at which the furnace fuel and air burn. The flame temperature can be increased by increasing the temperature of the air and/or the furnace fuel prior to their introduction into the furnace shell. Conventional fuel processing apparatus utilize a furnace and a heat exchanger separate from the furnace to heat the air or the air and furnace fuel prior to their introduction into the furnace. Flame temperatures utilizing a heat exchanger separate from the furnace to preheat the air are approximately 2200° F. However, this conventional design requires an expensive heat exchanger and does not minimize heat losses due to the transfer of combustion gases from the furnace to the heat exchanger. Therefore, scientists and engineers have been searching for an inexpensive and efficient method and apparatus to increase the temperature of the furnace fuel and/or air prior to their introduction into the furnace.

DISCLOSURE OF THE INVENTION

According to the claims of present invention, a method and an apparatus for increasing the temperature at which a furnace fuel burns is disclosed. A method of increasing the flame temperature of combustion gases, the method is for use with a furnace of the type having a shell, an air inlet for introducing air into the shell, a fuel inlet for introducing a furnace fuel into the shell, and a fuel pre-heat chamber being disposed outside of the shell and integral with the shell. The method comprises introducing a low temperature furnace fuel through the fuel pre-heat chamber; flowing the low temperature furnace fuel through the fuel pre-heat chamber, such that the low temperature furnace fuel is in a heat transfer relationship with combustion gases, thereby heating the low temperature furnace fuel and producing a high temperature furnace fuel. Next, the method includes flowing the high temperature furnace fuel to the fuel inlet; and combusting the high temperature furnace fuel and air, thereby creating the combustion gases, the combustion gases having a flame temperature between about 2100° F. and about 2700° F. The method can also be for use with a furnace also having an air pre-heat chamber being disposed outside of the shell and integral with the shell. This method comprises the additional steps of introducing a low temperature air through the air pre-heat chamber; flowing the low temperature air through the air pre-heat chamber, such that the low temperature air is in a heat transfer relationship with combustion gases thereby heating the low temperature air and producing a high temperature air; flowing the high temperature air to the air inlet; and combusting the high temperature furnace fuel and the high temperature air, thereby creating the combustion gases having a flame temperature between about 2100° F. and about 2700° F.

One embodiment of the apparatus is a furnace for combusting a furnace fuel and air thereby creating combustion gases. The furnace has a shell, an air inlet for introducing the air into the shell, and a fuel inlet for introducing the furnace fuel into the shell, as well as, a fuel pre-heat chamber for heating a low temperature furnace fuel therein and introducing a high temperature furnace fuel into the shell through the fuel inlet. The fuel pre-heat chamber being disposed outside of the shell and integral with the shell, such that the low temperature furnace fuel within the fuel pre-heat chamber is in a heat transfer relationship with the combustion gases of the furnace.

Another embodiment of the apparatus is a furnace having an air pre-heat chamber for heating a low temperature air therein and introducing a high temperature air into the furnace. Yet another embodiment of the apparatus is a furnace having a fuel and an air pre-heat chamber for heating a low temperature furnace fuel and air, respectively, and introducing a high temperature furnace fuel and air into the furnace. Also disclosed is a fuel cell power plant utilizing fuel and air pre-heat chambers within the fuel processing apparatus where the low temperature furnace fuel is an anode exhaust from a fuel cell stack.

The foregoing invention will become more apparent in the following detailed description of the best mode for carrying out the invention and in the accompanying drawing.

BRIEF DESCRIPTION OF THE DRAWING

FIG. 1 is a perspective view of one embodiment of the present invention having a furnace with a fuel pre-heat chamber and an air pre-heat chamber.

FIG. 3 is an enlarged view from section 3 of FIG. 2 of a portion of one embodiment of the furnace fuel pre-heat chamber of the present invention.

FIG. 4 is a schematic representation of a fuel cell power plant

Figure 2:
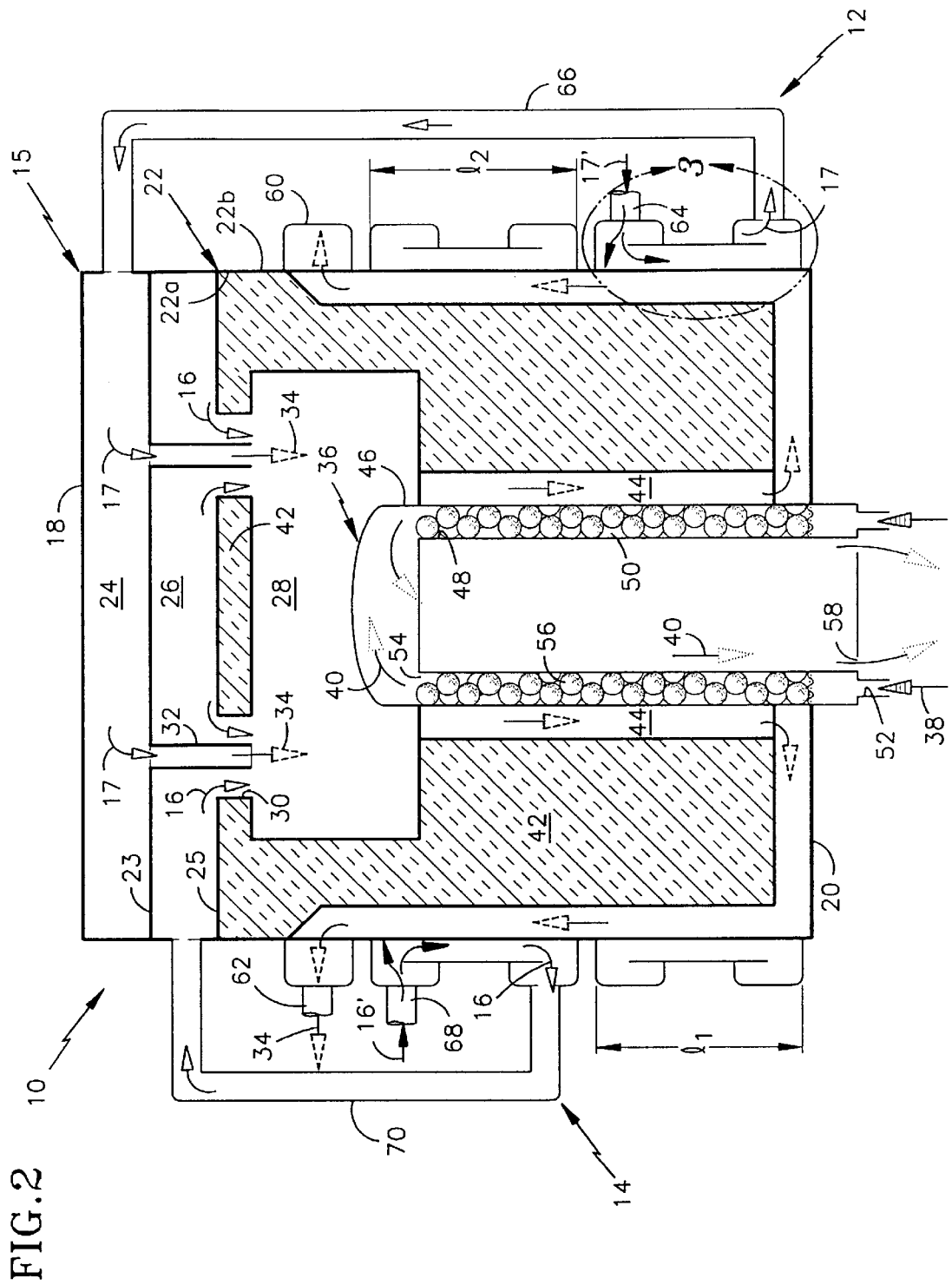
FIG. 2 is a diagrammatic representation of a cross sectional view of one embodiment of the present invention.

These figures are meant to be exemplary and not to limit the generally broad scope of the present invention.

BEST MODE FOR CARRYING OUT THE INVENTION

FIG. 1 is a perspective view of one embodiment of the present invention having a furnace 10 with a fuel pre-heat chamber 12 and an air pre-heat chamber 14. The furnace 10 to provide combustion gases by combusting a furnace fuel and air has a shell 15. The furnace can be any conventional furnace, such as those used for steam reforming a hydrocarbon fuel. The fuel and air pre-heat chambers are disposed on the outside of the shell and integral with the shell. Low temperature air 16' is shown entering the air pre-heat chamber. A low temperature furnace fuel 17' is shown entering the fuel pre-heat chamber. "Low temperature" means the gases have not passed through the pre-heat chambers.

FIG. 2 is a diagrammatic representation of a cross sectional view of one embodiment of the present invention. The furnace 10 has a shell 15. The shell 15 is formed by a top wall 18, a bottom wall 20 spaced from the top wall, and a vertical sidewall 22 disposed between the top and bottom walls. In this embodiment, the vertical sidewall is cylindrical. A first plenum wall 23 is spaced apart from the top wall 18 forming a fuel plenum 24 there between. A second plenum wall 25 is spaced apart from the first plenum wall 23 forming an air plenum 26 there between, and a furnace volume 28 therebelow. Air inlets, represented by the air inlet 30, are formed in the second plenum wall 25. High temperature air 16 flows from the air plenum 26 to the furnace volume 28 through the air inlets. Each air inlet has an associated fuel inlet, represented by the fuel inlet 32. Each fuel inlet is attached to the first plenum wall 23 and extends through the associated air inlet 30 into the furnace volume 28. The fuel inlet directs a high temperature furnace fuel 17 from the fuel plenum 24 into the furnace volume. Both the high temperature furnace fuel and air 17 and 16 are represented by arrows having open arrowheads drawn with a solid line to represent the "high temperature" state of the furnace fuel and air. "High temperature" means the gases have passed through the pre-heat chambers and are "preheated". The furnace uses a conventional mixing of the furnace fuel 33 and air 31 to achieve the combustion of the high temperature furnace fuel and air, thereby producing combustion gases 34. The combustion gases 34 are represented by arrows having open arrowheads drawn with a dashed line.

At least one vertical catalytic reactor 36 for steam reforming a hydrocarbon fuel and steam 38 into a product gas 40 is disposed in the furnace volume in a heat transfer relationship with the combustion gases 34. In this embodiment, insulation 42 is disposed within the shell 15, such that insulation 42 is disposed on the second plenum wall 25 within the furnace volume 28 and insulation 42 is spaced apart from a portion of the vertical sidewall 22, the bottom wall 20, and the catalytic reactor 36, thereby forming a combustion gas passageway 44 therebetween.

The catalytic reactor 36 has an outer wall 46 spaced from an inner wall 48 with a reaction chamber 50 therebetween. A reactor inlet 52 allows the hydrocarbon fuel and steam 38 to enter the reaction chamber. The hydrocarbon fuel and steam 38 are represented by arrows having stripped arrowheads. An outlet 54 is disposed within the reaction chamber spaced away from the reactor inlet for exit of the product gas 40 from the reaction chamber. The product gas 40 is represented by arrows having open arrowheads drawn with dotted lines. A catalyst 56 is disposed within the reaction chamber for aiding in the reformation. The catalytic reactor has reactor exit 58 for exiting of the product gas from the catalytic reactor.

The vertical sidewall 22 has an internal surface 22a within the furnace volume 28 and an opposed external surface 22b. The external surface 22b has a first portion $I_1$ and a second portion $I_2$. The first portion $I_1$ is near the bottom wall 20 of the shell. An exhaust manifold 60 for removing the combustion gases 34 from the shell surrounds the vertical sidewall 22 below the second plenum wall 25. The exhaust manifold 60 is in fluid communication with the combustion gas passageway 44. An exhaust port 62 is disposed through the exhaust manifold. The second portion $I_2$ is between the first portion $I_1$ and the exhaust manifold 60.

A fuel pre-heat chamber 12 for heating the low temperature furnace fuel 17' prior to introducing it into the shell is disposed outside the shell on the first portion $I_1$ concentrically surrounding the shell. The fuel pre-heat chamber is also integral with the shell. An air pre-heat chamber 14 for heating a low temperature air 16' prior to introducing it into the shell is disposed on the second portion $I_2$ concentrically surrounding the shell. The air pre-heat chamber is also integral with the shell. Both the low temperature furnace fuel and air are represented by arrows having solid arrowheads.

"Integral" as used in the specification and the appended claims means that the chambers are in such proximity with the shell, such that heat transfer from the vertical sidewall 22 is able to substantially raise the temperature of the furnace fuel and air within the chambers. The sidewall is heated by the combustion gases. Thus, the combustion gases are in a direct heat transfer relationship with the furnace fuel and air. The preferred embodiment of an integral chamber is one where the chamber is attached to the shell 15 by some means. The preferred means of attachment is welding.

The fuel pre-heat chamber 12 has an inlet 64 for entry of the low temperature furnace fuel 17', and an outlet 66 for exit of the high temperature furnace fuel 17. The outlet 66 is a feed pipe connecting the fuel pre-heat chamber 12 to the fuel plenum 24; however, any structure which allows fluid communication between the fuel pre-heat chamber and the fuel plenum can be used.

The air pre-heat chamber 14 has an inlet 68 for entry of the low temperature air 16', and an outlet 70 for exit of the high temperature air 16. The outlet 70 is a feed pipe connecting the air pre-heat chamber 14 to the air plenum 26; however, any structure which allows fluid communication between the air pre-heat chamber and the air plenum can be used.

In this embodiment, the fuel and air pre-heat chambers allow heating of the low temperature furnace fuel and air 17' and 16' so that high temperature furnace fuel and air 17 and 16 are introduced and burned in the shell. Preferably, the pre-heat chambers are integrally attached to the shell and concentrically surround the outside of the shell, as shown. Having the pre-heat chambers both integrally attached to and concentrically surrounding the shell allows the maximum heat recovery from the combustion gases and the minimum heat losses during heat transfer.

The size and position of the fuel and air pre-heat chambers may be changed in other embodiments. The preferred size is one which fully concentrically surrounds the outside of the shell's vertical sidewall; however, the size may be decreased to only partially surround the vertical sidewall. The preferred positioning of the pre-heat chambers due to thermodynamic considerations is that which allows the furnace fuel to be heated first.

FIG. 4 is a fuel cell power plant 90 for producing electricity from a hydrocarbon fuel. The fuel cell power plant 90 consists of a fuel cell 92 and a fuel processing apparatus 94. The fuel processing apparatus 94 includes a furnace 10 and a catalytic reactor 36. The fuel cell 92 electrochemically converts a hydrogenrich product gas and an oxidant into electricity. A plurality of individual fuel cells may be aligned in series to form a fuel cell stack. The fuel cell 92 is formed by an anode 95, a cathode 96, and an electrolyte 97 disposed therebetween. Both the anode 95 and the cathode 96 utilize various well known catalysts. The fuel processing apparatus 94 and the anode 95 are in fluid communication, such that the hydrogen containing product gas 40 is supplied to the anode where the product gas 40 is electrochemically reacted. The product gas 40 containing unused hydrogen flows to the furnace 10 from the anode 95 as an anode exhaust 98. The cathode 96, which is in fluid communication with an oxidant source 99, is supplied with an oxidant, usually in the form of oxygen. At the cathode 96, the oxidant is electrochemically reacted. The fuel processing apparatus 94 steam reforms a hydrocarbon fuel and steam 38 into the product gas 40 in the catalytically reactor 36 in order to increase the hydrogen content in the product gas 40. The product gas 40 is then fed to the fuel cell 92. The steam reformation process is accomplished by contacting the hydrocarbon fuel and steam 38 with a heated catalyst 56. The catalyst 56 is heated by the combustion gases 34 formed in the furnace 10 by the combustion of fuel or anode exhaust 98 and air 31.

Recall, the low temperature furnace fuel is normally an anode exhaust from a fuel cell. The anode exhaust exits the fuel cell at between about 325° F. and about 375° F. The low temperature air is fed to the air pre-heat chamber at about 60° F. or ambient temperature. Thermodynamic principles prescribe that when heating two fluids, the furnace fuel and air, in series by a counter-flowing heating fluid (i.e., the combustion gases) that in order to extract maximum energy from the heating fluid, the hotter fluid (i.e., the furnace fuel) must be heated prior to the cooler fluid (i.e., the air). Thus, the fuel pre-heat chamber is on the first portion $I_1$ of the vertical sidewall and the air pre-heat chamber is on the second portion $I_2$ of the vertical sidewall.

However, in another embodiment, the pre-heat chambers may be positioned on different portions of the vertical sidewall, so long as both pre-heat chambers have a heat transfer relationship with the combustion gases adequate to substantially heat the furnace fuel and air within. The pre-heat chambers should be made of a conductive material capable of withstanding the thermal load of the operative conditions of the furnace. The preferred material is a metal such as stainless steel, but any equivalent material can be used.

Another embodiment can heat either the furnace fuel or the air alone with a single pre-heat chamber but this will not reduce the size of the catalytic reactor to the same magnitude as does the preferred embodiment in FIG. 2.

FIG. 3 is an enlarged view from section 3 of FIG. 2 of a portion of a fuel pre-heat chamber 12. The fuel pre-heat chamber is made up of a chamber wall 72, an upper manifold 73, and a lower manifold 74. The chamber wall fully concentrically surrounds and is spaced apart from the vertical sidewall 22 forming a heat transfer volume there between. The inlet 64 is disposed through the upper manifold 73 and the outlet 66 is disposed through the lower manifold 74.

The upper manifold uniformly distributes the low temperature furnace fuel 17' about the circumference of the fuel pre-heat chamber prior to the low temperature furnace fuel entering the heat transfer volume. The uniform distribution of the low temperature furnace fuel is accomplished by establishing an approximately constant static pressure about the circumference of the fuel pre-heat chamber. This constant static pressure is achieved by sizing the upper manifold 73 flow area to be substantially larger than the inlet 64 flow area. This flow area change minimizes the velocity of the low temperature furnace fuel as it enters the manifold, which holds the static pressure approximately constant about the manifold, and encourages the uniform distribution of the low temperature furnace fuel about the manifold.

The ends of the upper manifold 73 are attached to the external surface 22b of the vertical sidewall 22 and the chamber wall 72 by welds, represented by the weld 76. The ends of the lower manifold 74 are attached to the external surface 22b of the vertical sidewall and the chamber wall 72 in the same fashion as the upper manifold 73. The manifolds in this embodiment are two separate structures attached to the chamber wall, so that the chamber wall extends into the upper and lower manifolds a predetermined length. This extension of the chamber wall into the manifolds helps distribute the low temperature furnace fuel about the circumference of the heat transfer volume by deflecting the flow of the low temperature furnace fuel as it enters the manifold from the inlet 64. The length of the chamber wall is also determined by the necessary heat transfer volume needed to heat the furnace fuel. Various portions of the manifolds are curved to account for thermal stresses or forces during start-up, shut down and operation. The manifolds are to be formed by any metal forming technique capable of creating this annular curved surface. The preferred techniques are spinning or hydroforming the manifolds.

It is preferred that a plurality of spaced, helical flow paths, represented by the flow path 78, are disposed within the combustion gas passageway and the heat transfer volume. The flow paths increase the path length for heat transfer and increase heat transfer between the combustion gases 34 and the low temperature furnace fuel 17'. Preferably, these flow paths are created by a plurality of metal circular rods, represented by the combustion gas rod 80 and the chamber rod 82, which are helically-wound about the internal and external surfaces 22a and 22b, respectively, of the vertical sidewall and attached to the appropriate surfaces, as disclosed in U.S. Pat. No. 4,847,051, incorporated herein by reference in its entirety. In another embodiment the flow paths may be created by a plurality of flexible ceramic rods composed of ceramic fibers in the form of ceramic fiber ropes or "braids". Flexible ceramic rods in the form of ropes and braids, which are used for insulation and seals, are known by those of ordinary skill in the art. A flexible ceramic rod in the form of a rope is formed by twisting or braiding long ceramic fiber strands. A flexible ceramic rod in the form of a "braid" is formed by weaving, interlacing and interlocking long ceramic fiber strands. If the flexible ceramic rods used are "braids", the cross-section of the rod may be circular or rectangular. The ceramic fibers are commonly composed of alumina, silica or combinations thereof. The advantage to using flexible ceramic rods is their ability to conform to the space into which they are fitted, which decreases the internal stresses on the furnace and allows for relative thermal growth between parts. However, in another embodiment, the flow paths can also be created by forming grooves (not shown) into the surfaces as disclosed in U.S. Pat. No. 4,847,051.

The combustion gas rod 80 is wrapped in a helix and located on the internal surface 22a of the vertical sidewall. The chamber rod 82 is wrapped in a helix and located on the external surface 22b of the vertical sidewall. The combustion gas rods on the internal surface are disposed at spaced locations helically along the combustion gas passageway 44 from the bottom wall (not shown) to the exhaust manifold (not shown). The chamber rods on the external surface are disposed at spaced locations helically along the first portion $I_1$ or adjacent to the chamber wall 72 so that the chamber rods are within the heat transfer volume. In the preferred embodiment the air pre-heat chamber (not shown) has the same geometry as the fuel pre-heat chamber shown, including having helical flow paths formed in the same manner as above.

After start-up and during operation, referring to FIG. 2, the low temperature furnace fuel 17' enters the fuel pre-heat chamber 12 through the inlet 64. The low temperature furnace fuel in this embodiment is the anode exhaust which contains hydrogen. In a fuel cell power plant, it is preferable to use the anode exhaust from the fuel cell stack as the low temperature furnace fuel. Referring to FIGS. 2 and 3, the low temperature furnace fuel 17' flows around the circumference of the fuel pre-heat chamber then into the heat transfer volume. This flow is aided by the construction of the upper manifold 73 as described above, and aided by the attachment of the upper manifold to the chamber wall 72 so that the chamber wall acts as a deflector.

Referring to FIG. 2, the furnace 10 creates the combustion gases 34 within the furnace volume 28. The combustion gases 34 exit the furnace volume and flow along the combustion gas passageway 44 in a heat transfer relationship with the catalytic reactor 36, thus steam reforming the hydrocarbon fuel and steam 38 that is flowing through the heated catalyst 56. The steam reformation creates the product gas 40 within the catalytic reactor. Now, referring to FIGS. 2 and 3, the combustion gases flow in the combustion gas passageway 44 in the helical flow paths created by the combustion gas rods, represented by the combustion gas rod 80. At the same time the low temperature furnace fuel 17' flows within the heat transfer volume in the helical flow paths created by the chamber rods, represented by the chamber rod 82. The combustion gases and the low temperature furnace fuel are in a heat transfer relationship. The heat transfer relationship allows a substantial amount of heat from the combustion gases to pass to the unheated furnace fuel, thereby heating the furnace fuel. The high temperature furnace fuel 17 exits through the outlet 66 and travels to the fuel plenum 24 to be burned within the shell.

Similarly, the low temperature air 16' flows into the air pre-heat chamber 14 in a heat transfer relationship with the combustion gases, thereby heating the air. The high temperature air 16 exits through the outlet 70 and travels to the air plenum 26.

The high temperature furnace fuel 17 enters the furnace volume 28 from the fuel plenum using the fuel inlets 32. The high temperature furnace fuel has a temperature between about 500° F. to about 800° F. The high temperature air 16 enters the furnace volume from the air plenum using the air inlets 30. The high temperature air has a temperature between about 500° F. to about 700° F. In the embodiment shown the air is heated in series after heating the furnace fuel. The air is heated to a lower temperature than the furnace fuel since the energy left in the combustion gases is limited.

The high temperature furnace fuel and air burn in the furnace volume creating the combustion gases 34 with a high flame temperature. The range of the high flame temperature combustion gases is between about 2100° F. to about 2600° F. The upper limit of about 2600° F. is governed mainly by the nitric oxide emissions (i.e., NO and $NO_2$) which become unacceptable at flame temperatures much above 2600° F. The preferred range of the increased flame temperature is between about 2200° F. to about 2500° F. The combustion gases with an increased flame temperature flow along the catalytic reactor 36 and then in a heat transfer relationship with the fuel pre-heat chamber 12 prior to the air pre-heat chamber 14, as mentioned above.

The principal advantage to the embodiment illustrated in FIGS. 2 and 3 is the significant reduction in the size and/or number of catalytic reactors necessary for this reformation. The reduction is achieved by increasing the flame temperature of the combustion gases that heat the catalytic reactor. Using the embodiment shown, a catalytic reactor approximately two-thirds the size of prior art catalytic reactors can be used. The design of the fuel and air pre-heat chambers shown in FIGS. 2 and 3 is low in cost, efficient, compact, rugged, inherently safe and mechanically reliable.

While a particular invention has been described with reference to illustrated embodiments, this description is not meant to be construed in a limiting sense. It is understood that although the present invention has been described in a preferred embodiment, various modifications of the illustrative embodiments, as well as additional embodiments of the invention, will be apparent to persons skilled in the art upon reference of this description without departing from the spirit and scope of the invention, as recited in the claims appended hereto. It is therefore contemplated that the appended claims will cover any such modification or embodiments that fall within the true scope of the invention.

We claim:

1. A furnace to provide combustion gases by combusting a furnace fuel and air, said furnace having a shell, an air inlet for introducing the air into the shell, a fuel inlet for introducing the fume fuel into the shell, wherein said furnace comprises:

a fuel pre-heat chamber disposed outside of the shell and integral with the shell, said fuel pre-heat chamber receiving a low temperature furnace fuel, and flowing said low temperature furnace fuel in a heat transfer relationship with the combustion gases, thereby producing a high temperature furnace fuel, said fuel pre-heat chamber further being in fluid communication with the fuel inlet such that said high temperature furnace fuel flows into the shell through said fuel inlet said fuel pre-heat chamber having a chamber wall spaced apart from and concentrically, partially surrounding a portion of the shell;

an upper manifold to provide substantially uniform flow of the low temperature furnace fuel circumferentially about the fuel pre-heat chamber, said upper manifold being attached to the shell and to the chamber wall; and a lower manifold being attached to the shell and to the chamber wall spaced from the upper manifold.

2. The furnace of claim 1, wherein said chamber wall concentrically, fully surrounds a portion of the shell.

3. The furnace of claim 1, wherein the shell further comprises:

an internal surface within the shell;

an opposed external surface; and a plurality of s paced, helical flow paths disposed on said internal surface and said external surface of said shell.

4. The furnace of claim 3, wherein the helical flow paths are formed by a plurality of metal rods.

5. The furnace of claim 3, wherein the helical flow paths are formed by a plurality of flexible ceramic rods.

6. A furnace to provide combustion gases by combusting a furnace fuel and air, said furnace having a shell, an air inlet for introducing the air into the shell, a fuel inlet for introducing the furnace fuel into the shell, wherein said furnace comprises:

an air pre-heat chamber disposed outside of the shell and integral with the shell, said air pre-heat chamber receiving a low temperature air and flowing said low temperature air in substantially only a heat transfer relationship with the combustion gases, thereby producing a high temperature air, said air pre-heat chamber further being in fluid communication with said air inlet such that said high temperature air flows into the shell through said air inlet, said air pre-heat chamber having a chamber wall spaced apart from and concentrically, partially surrounding a portion of the shell;

an upper manifold to provide substantially uniform flow of the low temperature air circumferentially about the air pre-heat chamber, said upper manifold being attached to the shell and to the chamber wall; and a lower manifold being attached to the shell and to the chamber wall spaced from the upper manifold.

7. The furnace of claim 6, wherein said chamber wall concentrically, fully surrounds a portion of the shell.

8. The furnace of claim 6, wherein the shell further comprises:

an intern al surface within the shell;

an opposed external surface; and a plurality of spaced, helical flow paths disposed on said internal surface and said external surface of said shell.

9. The furnace of claim 8, wherein the helical flow paths are formed by a plurality of metal rods.

10. The furnace of claim 9, wherein the helical flow paths are formed by a plurality of flexible ceramic rods.

11. A furnace to provide combustion gases by combusting a furnace fuel and air, said furnace having a shell, an air inlet for introducing the air into the shell, a fuel inlet for introducing the furnace fuel into the shell, wherein said furnace comprises:

a fuel pre-heat chamber disposed outside of the shell and integral with the shell, said fuel pre-heat chamber receiving a low temperature furnace fuel and flowing said low temperature furnace fuel in a heat transfer relationship with the combustion gases, thereby producing a high temperature furnace fuel, said fuel pre-heat chamber further being in fluid communication with the fuel inlet such that said high temperature furnace fuel flows into the shell through said fuel inlet;

an air pre-heat chamber disposed outside of the shell and integral with the shell, said air pre-heat chamber receiving a low temperature air and flowing said low temperature air in a heat transfer relationship with the combustion gases, thereby producing a high temperature air, said air pre-heat chamber further being in fluid communication with said air inlet such that said high temperature air flows into the shell through said air inlet, wherein each of said fuel and air pre-heat chambers further comprise:

a chamber wall spaced apart from and concentrically, partially surrounding a portion of the shell;

an upper manifold to Provide substantially uniform flow of the low temperature furnace fuel or air circumferentially about the fuel or air pre-heat chamber, respectively, said upper manifold being attached to the shell and to the chamber wall; and a lower manifold being attached to the shell and to the chamber wall spaced from the upper manifold.

12. The furnace of claim 11, wherein each chamber wall concentrically, fully surrounds a portion of the shell.

13. The furnace of claim 11, wherein the shell further comprises:

an internal surface within the shell;

an opposed external surface; and a plurality of spaced, helical flow paths disposed on said internal surface and said external surface of said shell.

14. The furnace of claim 13, wherein the helical flow paths are formed by a plurality of metal rods.

15. The furnace of claim 13, wherein the helical flow paths are formed by a plurality of flexible ceramic rods.

16. A furnace to provide combustion gases by combusting a furnace fuel and air, said furnace having a shell, said shell having top wall, a bottom wall spaced from the top wall and a vertical sidewall disposed between the top and bottom walls, said vertical sidewall having an internal surface within the shell, and an opposed external surface, said external surface having a first portion disposed near the bottom wall and a second portion disposed above the first portion; an air inlet for introducing the air into the shell; a fuel inlet for introducing the furnace fuel into the shell; wherein the furnace comprises:

a fuel pre-heat chamber disposed outside of the shell and integral with the shell, said fuel pre-heat chamber receiving a low temperature furnace fuel and flowing said low temperature furnace fuel in a heat transfer relationship with the combustion gases, thereby producing a high temperature furnace fuel, said fuel pre-heat chamber further being in fluid communication with the fuel inlet such that said high temperature furnace fuel flows into the shell through said fuel inlet, said fuel pre-heat chamber having a chamber wall spaced apart from and concentrically, fully surrounding the first portion of the shell, an upper manifold to provide substantially uniform flow of the low temperature fuel circumferentially about the fuel pre-heat chamber, said upper manifold being attached to the shell and to the chamber wall, and a lower manifold being attached to the shell and to the chamber wall spaced from the upper manifold; and an air pre-heat chamber disposed outside of the shell and integral with the shell, said air pre-heat chamber receiving a low temperature air and flowing said low temperature air in a heat transfer relationship with the combustion gases, thereby producing a high temperature air, said air pre-heat chamber further being in fluid communication with said air inlet such that said high temperature air flows into the shell through said air inlet, said air pre-heat chamber having a chamber wall spaced apart from and concentrically, fully surrounding the second portion of the shell, an upper manifold to provide substantially uniform flow of the low temperature fuel circumferentially about the air pre-heat chamber, said upper manifold being attached to the shell and to the chamber wall, and a lower manifold being attached to the shell and to the chamber wall spaced from the upper manifold.

17. An improved fuel cell power plant of the type having a fuel processing apparatus to provide a product gas by steam reforming a hydrocarbon fuel and steam, said fuel processing apparatus having a furnace to provide combustion gases by combusting a furnace fuel and air, said furnace having a combustion chamber within a shell, an air inlet for introducing the air through the shell and into the combustion chamber, and a fuel inlet for introducing the furnace fuel through the shell and into the combustion chamber, said fuel processing apparatus further having a catalytic reactor disposed within the furnace in a heat transfer relationship with said combustion gases, said catalytic reactor having a catalyst bed therein, an inlet for introducing the hydrocarbon fuel and stream into contact with said catalyst bed thereby producing the product gas, and an exhaust for exiting of the product gas from said reactor, said power plant further having a fuel cell stack to provide electricity by electrochemically converting said product gas, said fuel cell stack having a plurality of fuel cells aligned in series, each of said fuel cells formed by an anode, a cathode, and an electrolyte disposed therebetween, said product gas from the catalytic reactor being in fluid communication with the anode, said anode producing an anode exhaust, and an oxidant in fluid communication with said cathode such that electricity is produced, wherein said improvement comprises:

a fuel preheat chamber being disposed outside of the shell and integral with the shell, said fuel preheat chamber receiving the anode exhaust and flowing the anode exhaust in a heat transfer relationship with the combustion gases, thereby creating a high temperature furnace fuel, said fuel preheat chamber further being in fluid communication with the fuel inlet such that said high temperature furnace fuel flows to fuel inlet, and an insulation layer means disposed between the combustion chamber and the shell adjacent the fuel pre-heat chamber for preventing direct heat radiation between the combustion gases in the combustion chamber and the fuel pre-heat chamber.

18. The power plant of claim 17, wherein the improvement further comprises:

an air preheat chamber disposed outside of the shell and integral with the shell, said air preheat chamber receiving a low temperature air and flowing said low temperature air in a heat transfer relationship with the combustion gases, thereby producing a high temperature air, said air preheat chamber further being in fluid communication with said air inlet such that said high temperature air flows into the shell through said air inlet, wherein the insulation layer is further disposed between the combustion chamber and the shell adjacent the air pre-heat chamber for preventing direct heat radiation between the combustion gases in combustion chamber and the air pre-heat chamber.

* * * * *